United States Patent
Iijima et al.

(10) Patent No.: US 7,023,509 B2
(45) Date of Patent: Apr. 4, 2006

(54) LIQUID CRYSTAL DISPLAY DEVICE WITH A PARTIAL REFLECTOR AND A POLARIZER ON THE PARTIAL REFLECTOR AND AN ELECTRONIC APPARATUS

(75) Inventors: Chiyoaki Iijima, Ina (JP); Yoshitomo Hirata, Toyoshina-machi (JP)

(73) Assignee: Seiko Epson Corporation, Tokyo (JP)

( * ) Notice: Subject to any disclaimer, the term of this patent is extended or adjusted under 35 U.S.C. 154(b) by 252 days.

(21) Appl. No.: 10/385,510

(22) Filed: Mar. 12, 2003

(65) Prior Publication Data

US 2004/0027510 A1 Feb. 12, 2004

(30) Foreign Application Priority Data

Apr. 9, 2002 (JP) ...................... 2002-106702

(51) Int. Cl.
*G02F 1/1335* (2006.01)

(52) U.S. Cl. .................................... 349/113
(58) Field of Classification Search ............... 349/113
See application file for complete search history.

(56) References Cited

U.S. PATENT DOCUMENTS 6,181,399 B1 * 1/2001 Odoi et al. ................. 349/113
6,519,209 B1 * 2/2003 Arikawa et al. ............ 368/242
2001/0024253 A1 * 9/2001 Ishihara ..................... 349/113

FOREIGN PATENT DOCUMENTS

| JP | A-2001-504238 | 3/2001 |
| JP | A-2001-512845 | 8/2001 |

* cited by examiner

*Primary Examiner*—Andrew Schechter
*Assistant Examiner*—Georges Y. Wang
(74) *Attorney, Agent, or Firm*—Oliff & Berridge, PLC

(57) ABSTRACT

A liquid crystal display device of the present invention includes a liquid crystal panel including a liquid crystal layer 4-sandwiched between opposed upper and lower substrates, and upper and lower polarizing layers provided at the top and bottom of the liquid crystal layer-4, a reflective layer formed on the inner surface of the lower substrate and having through holes for transmitting light, a lower polarizing plate provided on the reflective layer, the lower polarizing layer having apertures which are continued from the through holes of the reflective layer and which are formed at substantially the same planar portions as the through holes. Therefore, the present invention provides a transflective liquid crystal display device capable of a light display even in a transmissive mode, and a manufacturing method therefor.

8 Claims, 9 Drawing Sheets

A

B

C

LIQUID CRYSTAL DISPLAY DEVICE WITH A PARTIAL REFLECTOR AND A POLARIZER ON THE PARTIAL REFLECTOR AND AN ELECTRONIC APPARATUS

BACKGROUND OF THE INVENTION

1. Field of the Invention

The present invention relates to a liquid crystal display device, a manufacturing method therefor, and an electronic apparatus. Particularly, the present invention relates to a construction of a transflective liquid crystal display device capable of a sufficiently light display in a transmissive mode, and a method of manufacturing a liquid crystal display device comprising the construction.

2. Description of the Related Art

In recent, a transflective liquid crystal display device has been put into practical use, the display device having a reflective mode for a display using external light such as natural light, illumination light, or the like, and a transmissive mode for a display using an illumination device such as a back light as a light source. A known example of such a transflective liquid crystal display device comprises a reflective layer provided inside a liquid crystal panel, for reflecting external light, wherein the reflective layer partially has through holes for transmitting light so that light from a back light is transmitted through the through holes to perform a transmissive mode display.

SUMMARY OF THE INVENTION

In a conventional transflective liquid crystal display device, in a reflective mode display, light incident on a liquid crystal panel passes twice through a liquid crystal layer during the time it is reflected by a reflective layer and emitted to the outside. Therefore, circularly polarized light is reflected by the reflective layer to reverse the rotation direction of the polarizing axis, for switching pixels. In this construction, in order to achieve light and dark displays in the transmissive mode, light incident on the liquid crystal layer from the lower substrate side must be converted to circularly polarized light. As a result, light incident on a polarizing plate on the upper substrate side is converted to circularly polarized light or linearly polarized light, and in the light display, a part (about a half) of the incident circularly polarized light is transmitted for the display. In this way, in the transmissive mode, the utilization efficiency of light incident on the liquid crystal layer is low, thereby causing the problem of failing to achieve sufficient brightness in the transmissive mode.

An object of the present invention is to provide a transflective liquid crystal display device capable of a light display even in a transmissive mode.

Another object of the present invention is to provide a method of manufacturing a liquid crystal display device, which is capable of manufacturing a liquid crystal device without significantly increasing the number of steps.

A further object of the present invention is to provide an electronic apparatus comprising a liquid crystal display part exhibiting display brightness and excellent visibility.

(Liquid Crystal Display Device)

In order to solve the problem of the above-described transflective liquid crystal display device in which a transmissive mode display has insufficient brightness, a liquid crystal display device has been proposed, in which a polarizing layer having the same function as a polarizing plate is provided over the entire inner surfaces of a pair of substrates which constitute a liquid crystal panel.

FIG. 7 is a drawing showing a sectional structure of this type of transflective liquid crystal display device which comprises a liquid crystal panel 100 sealed with a sealing material 105 and comprising a liquid crystal layer 104 sandwiched between an upper substrate 101 and a lower substrate 102 opposed to each other, and a back light (illumination device) 130 disposed at the back (the lower side in the drawing) of the liquid crystal panel 100.

Also, a color filter layer 111, a planarizing film 112, a plurality of electrodes 113 arranged in stripes in a plane, and an alignment film 114 are provided on the inner surface (the liquid crystal layer 104 side) of the upper substrate 101 of the liquid crystal panel 100. Furthermore, a forward scattering plate 117, a retardation plate 118, and a poling plate 119 are laminated in turn on the outer surface (the upper side in the drawing) of the upper substrate 101.

On the other hand, a reflective layer 120, a polarizing layer 121, a planarizing film 122, a plurality of electrodes 123 arranged in stripes in a plane, and an alignment film 124 are provided on the inner surface (the liquid crystal layer 104 side) of the lower substrate 102 of the liquid crystal panel 100. Furthermore, a polarizing plate 129 is provided on the outer surface of the lower substrate 102. The extension direction of the electrodes 123 on the lower substrate 102 is perpendicular to the extension direction of the electrodes 113 on the upper substrate 101. The reflective layer 120 has partially through holes 110 so that light of the back light 130 is incident on the liquid crystal layer 104 through the through holes 110.

FIG. 8 is a drawing illustrating the display principle of a transflective liquid crystal display device having the above-described construction, and showing only a principal portion of the liquid crystal display device shown in FIG. 7. In FIG. 8, a reflective mode operation is shown on the left side, and a transmissive mode operation is shown on the right side.

As shown in FIG. 8, in the liquid crystal display device shown in FIG. 7, with a voltage applied to the liquid crystal layer 104 (on state), dots are darkly displayed in both the reflective mode and the transmissive mode, while with no voltage applied (off state), the dots are brightly displayed.

As shown on the left side of FIG. 8, in the reflective mode, external light incident on the liquid crystal panel 100 is converted into linearly polarized light parallel to the drawing by the polarizing plate 119 having a transmission axis parallel to the drawing and then incident on the liquid crystal layer 104. When the liquid crystal layer 104 is in an on state, the incident light is incident, as linearly polarized light parallel to the drawing, on the polarizing layer 121, and absorbed by the polarizing layer 121 having a transmission axis perpendicular to the drawing, thereby performing a dark display of the dots. On the other hand, when the liquid crystal layer 104 is in an off state, the incident light is converted into linearly polar light perpendicular to the drawing by the operation of the liquid crystal layer 104, and then incident on the polarizing layer 121. After being transmitted through the polarizing layer 121, the light is reflected by the reflective layer 120, again passes through the polarizing layer 121, and is then incident on the liquid crystal layer 104. The light is converted into linearly polarized light parallel to the drawing by the operation of the liquid crystal layer 104, transmitted through the polarizing plate 119, and then emitted to the outside of the upper substrate 101. In this case, the dots are brightly displayed.

As shown on the right side of FIG. 8, in the transmissive mode, light emitted from the back light 130 is converted into linearly polarized light perpendicular to the drawing by the polarizing plate 129, incident on the polarizing layer 121 through the through holes 110 provided in the reflective layer 120, passes through the polarizing layer 121 having a transmission axis perpendicular to the drawing, and then incident on the liquid crystal layer 104. In this case, when the liquid crystal layer 104 is an on state, the incident light is incident, as linearly polarized light perpendicular to the drawing, on the polarizing plate 119 of the upper substrate 101 without being subjected to the operation of the liquid crystal layer 104, and absorbed by the polarizing plate 119 having a transmission axis parallel to the drawing thereby performing a dark display of the dots. On the other hand, when the liquid crystal layer 104 is in an off state, the incident light is converted into linearly polarized light parallel to the drawing by the operation of the liquid crystal layer 104, and then incident on the polarizing plate 119. After being transmitted through the polarizing plate 119, the light is emitted to the outside to perform a light display of the dots.

In the liquid crystal display device shown in FIG. 7, which comprises the polarizing layer 121 provided inside the substrates 101 and 102, in the transmissive mode light display, light incident on the polarizing plate 119 from the liquid crystal layer 104 is linearly polarized light, and is thus hardly absorbed by the polarizing plate 119, thereby solving the problem of a conventional transflective liquid crystal display device in which the transmissive mode has insufficient brightness. Therefore, the liquid crystal display device is capable of a light display.

From the structural viewpoint, the liquid crystal display device shown in FIG. 7 can make the best use of light incident on the liquid crystal layer 104 for a display. Therefore, the display brightness of the transmissive mode can be possibly increased to about 2 times as large as that in a conventional display device. However, the display brightness of the transmissive mode cannot be actually increased to about 2 times, and a difference of display brightness still occurs between the transmissive mode and the reflective mode. Therefore, the inventors repeatedly performed studies for solving the problem of low brightness in the transmissive mode of the transflective liquid crystal display device, leading to the achievement of the present invention.

In order to solve the problem, a liquid crystal display device of the present invention comprises a liquid crystal panel comprising a liquid crystal layer sandwiched between opposed upper and lower substrates, and upper and lower poling layers provided at the top and bottom of the liquid crystal layer, and a lower polarizing plate provided on the outer surface of the lower substrate, and a reflective layer partially formed on the inner surface of the lower substrate, wherein the lower polarizing layer is formed only on the reflective layer within a display region.

In the liquid crystal display device of the present invention, the lower polarizing layer is provided at substantially the same planar position as the reflective layer partially formed for reflecting light in a reflective mode, and the lower polarizing layer is not formed in a region (i.e., a transmissive display region) in which the reflective layer is not provided. In this construction, the display brightness of the transmissive mode can be improved, and thus the liquid crystal display device exhibits a small difference in display brightness between the transmissive mode and the reflective mode, and excellent visibility.

The inventors repeatedly performed studies for solving the problem of the transflective liquid crystal display device shown in FIG. 7 in which the transmissive mode has low brightness. As a result, the problem was found to be caused by the fact that in the transmissive display region (i.e., the planar region of each through hole 110 provided in the reflective layer 120), the polarizing function of the polarizing layer 121 provided inside the liquid crystal panel 100 is lower than that in the reflective display region (i.e., the region provided with the reflective layer 120). Namely, light emitted from the back light 130 passes through the through holes 110 and is then dampened by the polarizing layer 121 to decrease the utilization efficiency of a light source, thereby failing to achieve sufficient brightness in the transmissive mode.

In this way, the polarizing function of the polarizing layer 121 deteriorates by the through holes 110 of the reflective layer 120. This is possibly due to the method of forming the polarizing layer. In further detail, the polarizing layer 121 is formed by coating a solution of a liquid crystal material on the reflective layer, and then solidifying by drying. However, in order to determine a direction of the transmission axis of the polarizing layer, the layer is stretched in a predetermined direction with the stress applied. In this forming method, the liquid crystal material is sufficiently oriented on the reflective layer 120 having a flat plane to obtain good polarization characteristics. However, in the through holes 110, the orientation of the liquid crystal material, which constitutes the polarizing layer, is disturbed near steps between the holes 110 and the reflective layer 120. Therefore, in the through holes 110, the polarizing function of the polarizing layer 121 is decreased to a level lower than that on the reflective layer 120, thereby damping light passing through the through holes from the lower substrate 102 side.

Also, the polarizing layer formed by using the liquid crystal material generally exhibits lower polarization degree and transmittance than a polarizing plate formed by stretching a film. Therefore, when light emitted from the back light 130 passes twice through the polarizing layer 121 and the polarizing plate 129, the transmittance deteriorates.

On the other hand, the liquid crystal display device of the present invention comprises a construction in which the apertures of the lower polarizing layer are disposed above the through holes of the reflective layer, and thus light passing through the apertures and incident on the liquid crystal layer is not dampened by the lower polarizing layer to improve the utilization efficiency of the light source, thereby achieving a light display.

In the liquid crystal display device of the present invention, the reflective layer and the lower polarizing layer are preferably formed in substantially the same planar shape. In this construction, the lower polarizing layer of substantially the same planar shape is formed at substantially the same planar position as the reflective layer so that light passing through a region (the transmissive display region) other than the reflective layer is incident on the liquid crystal layer without being dampened by the lower polarizing layer. Also, the reactive display region (the planar region of overlap between the reflective layer and the polarizing layer) can be maximized to improve the display brightness of the transmissive mode while securing the maximum display brightness in the reflective mode.

In the liquid crystal display device of the present invention, a light diffusing means is preferably provided above the reflective layer or on the reflective layer. In this construction, light reflected by the reflective layer can be diffused to significantly increase the strength of the reflected light in the regular direction of the reflected light, thereby preventing a loss of the visibility of the liquid crystal display device. As the light diffusing means, fine irregularity may be added to the reflective layer, a light diffusing layer may be provided on the reflective layer, or the forward scattering plate may be used.

In the liquid crystal display device of the present invention, a light-transmitting resin layer may be provided in a region where the reflective layer and lower polarizing layer are not provided. In this construction, the side ends of the reflective layer and lower polarizing layer can be protected by the resin layer, and the height of the steps formed by the partially formed reflective layer and lower polarizing layer can be decreased to improve the flatness of the upper surface of the lower polarizing layer. Therefore, the thickness of the liquid crystal layer can be prevented from being made nonuniform by the steps, and thus the occurrence of disturbance in a display can be prevented.

In the liquid crystal display device of the present invention, a protective layer may be formed to cover the reflective layer, and the lower polarizing layer may be formed on the protective layer at substantially the same planar position as the reflective layer. In the liquid crystal display device having this construction, the steps formed by the partially formed reflective layer can be previously flattened by the protective layer, and the lower polarizing layer is partially formed on the flat surface. In this construction, the liquid crystal material constituting the lower polarizing layer can be sufficiently oriented to form the lower polarizing layer having excellent polarization characteristics, thereby improving the display quality of the liquid crystal display device.

In the liquid crystal display device of the present invention, the lower polarizing layer preferably comprises a water-soluble dichroic dye. This material is disclosed as a water-soluble lyotropic liquid crystal dye material in International Publication No. WO99/08140. In this construction, the lower polarizing layer can easily be patterned to facilitate the manufacture.

(Method of Manufacturing a Liquid Crystal Display Device)

A method of manufacturing a liquid crystal display device of the present invention, which comprises a liquid crystal panel comprising a liquid crystal layer, which are sandwiched between opposed upper and lower substrates, and upper and lower polarizing layers provided at the top and bottom of the liquid crystal layer, comprises the steps of:

partially forming a reflective layer on the lower substrate;

forming a protective layer to cover the reflective layer;

forming a lower polarizing layer on the protective layer by using a water-soluble lyotropic liquid crystal dye material;

forming a photosensitive resin layer on the lower polarizing layer;

patterning the photosensitive resin layer in substantially the same planar shape as the reflective layer; and patterning the lower polarizing layer in substantially the same planar shape as the reflective layer by using the photosensitive resin layer as a mask layer.

The manufacturing method can easily manufacture the liquid crystal display device in which the reflective layer having through holes is planarized by the protective layer, and the lower polarizing layer is formed on the flat surface of the protective layer so that the lower polarizing layer is formed at substantially the same planar position as the partially provided reflective layer. In this construction, in order to pattern the lower polarizing layer, the photosensitive resin layer is formed on the lower polarizing layer, exposed to light, and then developed to pattern the photosensitive resin layer, and the lower polarizing layer is partially removed by using the photosensitive resin layer as the mask layer.

A method of manufacturing a liquid crystal display device of the present invention, which comprises a liquid crystal panel comprising a liquid crystal layer which are sandwiched between opposed upper and lower substrates, and upper and lower polarizing layers provided at the top and bottom of the liquid crystal layer, comprises the steps of:

forming a reflective layer on the lower substrate;

forming a lower polarizing layer on the reflective layer by using a water-soluble lyotropic liquid crystal dye material;

forming a photosensitive resin layer on the lower polarizing layer;

patterning the photosensitive resin layer;

patterning the lower polarizing layer by using the photosensitive resin layer as a mask layer; and patterning the reflective layer by using the photosensitive resin layer as a mask layer.

The manufacturing method can easily manufacture a liquid crystal display device in which a lower polarizing layer is formed on a reflective layer partially formed on a substrate so that the lower polarizing layer has substantially the same planar as the reflective layer. This construction is the same as the above-described manufacturing method in the step of pattering the lower polarizing layer. However, in this construction, the reflective layer is partially removed through the patterned lower polarizing layer to pattern the reflective layer. Therefore, this manufacturing method uses one photosensitive resin layer as the mask layer for patterning the reflective layer and patterning the lower polarizing layer, and thus a photolithography process may be performed once for forming the mask to achieve the effect of decreasing the number of the steps and cost.

A method of manufacturing a liquid crystal display device of the present invention, which comprises a liquid crystal panel comprising a liquid crystal layer which are sandwiched between opposed upper and lower substrates, and upper and lower polarizing layers provided at the top and bottom of the liquid crystal layer, comprises the steps of:

partially forming a reflective layer on the lower substrate;

selectively providing a light-transmitting water-repellent resin in a region without the reflective layer to form a resin layer; and forming a lower polarizing layer on the reflective layer by using a water-soluble lyotropic liquid crystal dye material.

The manufacturing method can easily manufacture a liquid crystal display device in which a lower polarizing layer is formed on a reflective layer partially formed on a substrate, and a region without the reflective layer and lower polarizing layer is filled with a light-transmitting resin.

The manufacturing method of the present invention uses the fact that the liquid crystal material constituting the lower polarizing layer is water soluble. Namely, the light-transmitting water-repellent resin is previously provided in the region in which the lower polarizing layer is not provided, and then a solution of the crystal material is coated on the resin. As a result, the water-soluble lyotropic liquid crystal dye material is expelled from the water repellent resin to form the lower polarizing layer only on the reflective layer without forming on the water repellent resin.

Also, in the construction of the manufacturing method, the height of the water repellent resin is preferably larger than that of the reflective layer, and is equal to the thickness of the laminate of the reflective layer and the lower polarizing layer. By forming the water repellent resin layer at such a height, the liquid crystal material solution for forming the lower polarizing layer is less coated on the water-repellent resin formed in the through holes of the reflective layer. Therefore, it is possible to effectively prevent the lower polarizing layer from being formed on the through holes of the reflective layer.

A method of manufacturing a liquid crystal display device of the present invention comprising a liquid crystal panel which comprises a liquid crystal layer sandwiched between opposed upper and lower substrates, and upper and lower polarizing layers provided at the top and bottom of the liquid crystal layer, comprises the steps of:

forming a reflective layer on the lower substrate;

forming a transparent conductive material layer on the reflective layer;

patterning the reflective layer and the transparent conductive material layer;

forming a lower polarizing layer on the patterned transparent electrode layer by using a water-soluble lyotropic liquid crystal dye material; and removing the lower polarizing layer from a region other than the region on the transparent electrical layer.

This manufacturing method utilizes the fact that the liquid crystal material for forming the lower polarizing layer has high adhesion to the transparent conductive material and low adhesion to glass for forming the lower substrate, for selective disposing the lower polarizing layer. When the liquid crystal material solution for the lower polarizing layer is coated on the transparent conductive material layer selectively disposed, the lower polarizing layer strongly adheres to the transparent conductive material layer, but the lower polarizing layer has low adhesion to the base material (for example, the lower substrate) in a region where the transparent conductive material layer is not provided. Therefore, after the lower polarizing layer is formed, the lower polarizing layer formed in such a region is removed over the entire surface of the substrate to selectively leave the lower polarizing layer formed only on the transparent conductive material layer. In this way, the liquid crystal display device comprising the lower polarizing layer selectively formed only on the reflective layer can be manufactured.

In the method of manufacturing the liquid crystal display device of the present invention, the step of patterning the lower polarizing layer or the step of partially removing the lower polarizing layer can be performed by water washing. The lower polarizing layer of the present invention comprises the water-soluble lyotropic liquid crystal dye material, and can thus be partially removed by water washing even after being formed.

The method of manufacturing the liquid crystal display device of the present invention may further comprise the step of forming a protective layer to cover the lower polarizing layer. In this construction, the lower polarizing layer selectively formed on a predetermined region (on the reflective layer) can be protected, and the steps formed by the through holes of the reflective layer and the apertures of the lower polarizing layer can be planarized by the protective layer, thereby facilitating the formation of an electrode layer and an alignment film.

In the method of manufacturing the liquid crystal display device of the present invention, in the step of forming the lower polarizing layer, the liquid crystal material solution is preferably coated on a coating surface under the stress applied thereto. This manufacturing method can easily form the lower polarizing layer having a transmission axis in a predetermined direction.

[Electronic Apparatus]

An electronic apparatus of the present invention comprises any one of the above-described liquid crystal display devices. This construction is capable of providing an electronic apparatus comprising a liquid crystal display part exhibiting display brightness in a transmissive mode and excellent visibility.

Figure 1:
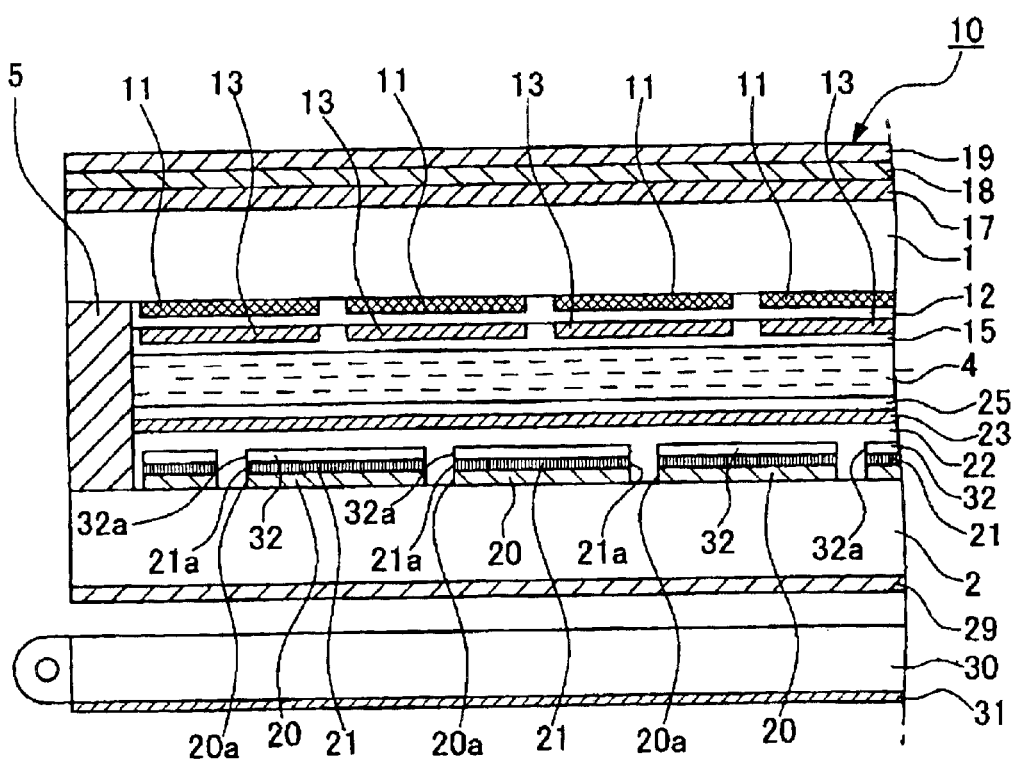
FIG. 1 is a partial sectional view showing the construction of a liquid crystal display device according to an embodiment of the present invention.

REFERENCE NUMERALS 1 upper substrate
2 lower substrate
4 liquid crystal layer
5 sealing material
10 liquid crystal panel
20 reflective layer
20a through hole
21 lower polarizing layer
21a aperture
32 photosensitive resin layer
32a aperture
22 protective layer (resin layer)
30 back light

DESCRIPTION OF THE PREFERRED EMBODIMENTS

An embodiment of the present invention will be described below with reference to the drawings.

(Liquid Crystal Display Device)

FIG. 1 is a partial sectional view showing a construction of a liquid crystal display device according to an embodiment of the present invention. The liquid crystal display device shown in the drawing schematically comprises a liquid crystal panel 10, and a back light (illumination device) 30 disposed at the back (the lower side of the drawing) of the liquid crystal panel 10. In this embodiment, a description is made of a case in which the present invention is applied to a passive matrix-type liquid crystal display device. In the each of the drawings, the thickness and dimensions of each component are appropriately changed for making the drawing easy to see.

The liquid crystal panel 10 comprises an upper substrate 1 and a lower substrate 2 which are opposed to each other, and a liquid crystal layer 4 sandwiched between the substrates 1 and 2 and sealed with a sealing material 5.

Also, a plurality of color filters 11 arranged in a matrix planar form, a planarizing film 12 formed to cover the color filters 11, a plurality of electrodes 13 formed in stripes in a plane on the planarizing film 12 and comprising a transparent conductive material such as ITO or the like, and an alignment film 15 formed to cover the electrodes 13 are provided on the inner surface (the liquid crystal layer 4 side) of the upper substrate 1. Furthermore, a forward scattering plate 17, a retardation plate 18 and a polarizing plate 19 are laminated on the outer surface of the upper substrate 1.

On the other hand, a reflective layer 20 comprising a high-reflectance metal thin film of Al, Ag, or the like, a lower polarizing layer 21, a photosensitive resin layer 32 formed on the lower polarizing layer 21, a protective layer (resin layer) 22 comprising a resin material formed to cover the photosensitive resin layer 32, a plurality of electrodes 23 formed in stripes in a plane on the protective layer 22 and comprising a transparent conductive material such as ITO or the like, and an alignment film 25 formed to cover the electrodes 23 are provided on the inner surface (the liquid crystal layer 4 side) of the lower substrate 2. Furthermore, a polarizing plate 29 is provided on the outer surface of the lower substrate 2.

Furthermore, a reflective film 31 comprising a high-reflectance metal film of Al, Ag, or the like is provided on the outer surface (opposite to the liquid crystal panel 10 side) of the back light 30.

The reflective layer 20 formed on the lower substrate 2 has through holes 20*a* formed therein to passing the reflective layer 20, the lower polarizing layer 21 formed on the reflective layer 20 has apertures 21*a* formed therein to pass through the lower polarizing layer 21, and the photosensitive resin layer 32 formed on the lower polarizing layer 21 also has apertures 32*a* formed therein to pass through the photosensitive resin layer 32. The through holes 20*a*, and the apertures 21*a* and 32*a* are formed in the same planar shape at the same planar positions. Furthermore, the protective layer 22 formed to cover the photosensitive resin layer 32 fills in the apertures 21*a* and 32*a* and the through holes 20*a*.

In the liquid crystal display device of this embodiment having the above-described construction, light emitted from the back light 30 passes through the through holes 20*a* and is incident on the liquid crystal layer 4 without passing through the lower polarizing layer 21. Therefore, the light incident on the liquid crystal layer 4 is not dampened by the lower polarizing layer 21, thereby increasing the brightness of the transmission mode display. Since the protective layer fills in the apertures 21*a* and 32*a*, and the through holes 20*a*, the side surfaces of the reflective layer 20 and the lower polarizing layer 21 can be protected from moisture and corrosive components to achieve high reliability.

In this embodiment, the lower polarizing layer 21 preferably comprises a liquid crystal material mainly composed of a water-soluble lyotropic liquid crystal. This type of liquid crystal material is water soluble, and thus an aqueous solution of the material can be coated on the reflective layer 20 and spread on the reflective layer under stress to form the polarizing layer having a transmission axis in a predetermined direction. As the material for forming the lower polarizing layer 21, a liquid crystal material mainly composed of a thermotropic liquid crystal can also be used. In this case, the lower polarizing layer 21 can be formed by forming an alignment film on the reflective layer 20, rubbing the alignment film in a predetermined direction, coating the liquid crystal material on the alignment film, and then irradiating the material with light to solidify it by photopolymerization due to the photosensitive resin mixed in the material.

In manufacturing the liquid crystal display device having the above construction, the photosensitive resin layer 32 is provided as a mask layer for forming the apertures 21*a* in the lower polarizing layer 21 and the through holes 20*a* in the reflective layer 20, and thus the photosensitive resin layer 32 may be removed after the apertures 21*a* and the through holes 21*a* are formed. However, even if the photosensitive resin layer 32 is not removed, no trouble occur in the construction and operation of the liquid crystal display device, and thus the photosensitive resin layer 32 is preferably left without being removed from the viewpoint of simplification of the manufacturing process.

Figure 2:
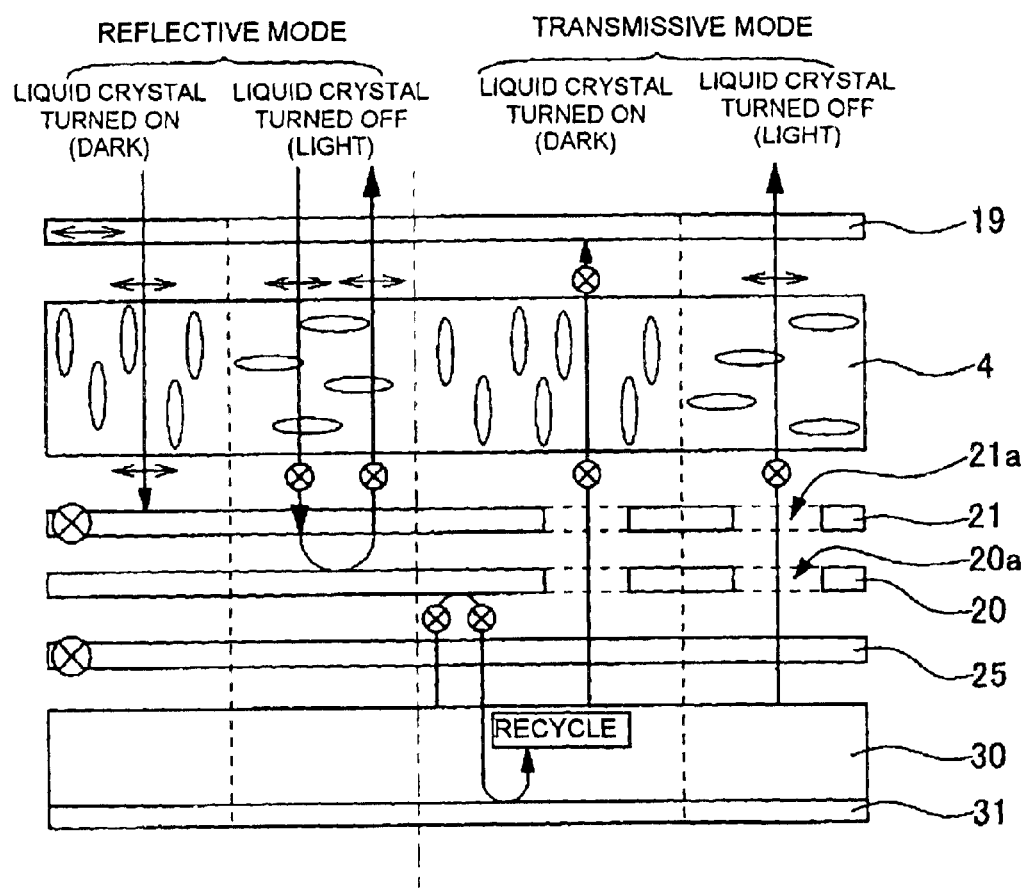
FIG. 2 is a drawing illustrating the operation principle of the liquid crystal display device shown in FIG. 1.

Next, the operation principle of the liquid crystal display device having the above-described construction will be described with reference to FIG. 2. FIG. 2 is a drawing showing only a principal portion of the liquid crystal display device shown in FIG. 1, for illustrating the operation principle of the liquid crystal display device. In FIG. 2, an operation in the reflective mode is shown on the left side, and an operation in the transmissive mode is shown on the right side. In the description below, it is assumed that with the voltage applied (on state), the liquid crystal layer 4 is oriented substantially perpendicularly to the plane direction of the substrates 1 and 2, while with no voltage applied (off state), the liquid crystal layer 4 is oriented substantially parallel to the plane direction of the substrates 1 and 2. Therefore, when the liquid crystal layer 4 is turned on, light incident on the liquid crystal layer 4 passes through the liquid crystal layer with being hardly subjected to the operation of the liquid crystal layer. When the liquid crystal layer 4 is turned off, light incident on the liquid crystal layer 4 passes through the liquid crystal layer while being subjected to the operation of the liquid crystal layer 4. The operation of the liquid crystal layer 4 represents a polarization conversion function including rotation and birefringence of polarized light incident on the liquid crystal layer.

As shown on the left side of FIG. 2, in the reflective mode, external light incident on the liquid crystal panel 10 is converted to linearly polarized light parallel to the drawing by the polarizing plate 19 having the transmission axis parallel to the drawing, and then incident on the liquid crystal layer 4. When the liquid crystal layer 4 is turned on, the incident light is incident, as the linearly polarized light parallel to the drawing, on the polarizing layer 21, and is absorbed by the lower polarizing layer 21 having the transmission axis perpendicular to the drawing to perform a dark display of dots. On the other hand, when the liquid crystal layer 4 is turned off, the incident light is converted to linearly polarized light perpendicular to the drawing by the rotatory function of the liquid crystal layer 4, incident on the polarizing layer 21, passes through the polarizing layer 21 having the transmission axis perpendicular to the drawing, and is then incident on the reflective layer 20. Next, the light is reflected by the reflective layer 20, again passes through the polarizing layer 21, and is then incident on the liquid crystal layer 4 from the lower substrate 2 side. In this case, the liquid crystal layer 4 is turned off and thus the light passing through the liquid crystal layer 4 is converted to linearly polarized light parallel to the drawing by the rotatory function of the liquid crystal layer 4. Then, the light passes through the polarizing plate 19 having the transmission axis parallel to the drawing and is emitted to the outside to perform a light display of the dots.

As shown on the right side of FIG. 2, in the transmissive mode, light emitted from the back light 30 is converted to linearly polarized light perpendicular to the drawing by the polarizing plate 29, passes through the through holes 20a formed in the reflective layer 20 and the apertures 21a of the lower polarizing layer 21, and is then incident on the liquid crystal layer 4. When the liquid crystal layer 4 is turned on, the incident light is incident, as the linearly polarized light perpendicular to the drawing, on the polarizing plate 19 of the upper substrate 1 without being subjected to the operation of the liquid crystal layer 4, and is absorbed by the polarizing plate 19 having the transmission axis parallel to the drawing to perform a dark display of dots. On the other hand, when the liquid crystal layer 4 is turned off, the incident light is converted to linearly polarized light parallel to the drawing by the operation of the liquid crystal layer 4, incident on the polarizing plate 19. Then, the light passes through the polarizing plate 19 and is emitted to the outside to perform a light display of the dots.

Also, the light emitted from the back light 30 passes through the polarizing plate 25, and is reflected by the outer side (the lower substrate 2 side) of the reflective layer 20. Since the light is converted to linearly polarized light perpendicular to the drawing by the polarizing plate 25, the light passes through the polarizing plate 25 and is again incident on the back light 30. Then, the light is reflected by the reflective film 31 provided on the outside of the back light 30, and is again emitted to the liquid crystal panel 10. In this way, the light reflected by the outside of the reflective layer 20 is repeatedly reflected between the back light 30 and the reflective film 31. During repeated reflections, the light passes through the through holes 20a of the reflective layer 20 and is used as display light. Therefore, in the liquid crystal display device of this embodiment, light emitted from the back light 30 can be used for a display in the transmissive mode with high efficiency to improve the utilization efficiency of the light source, thereby achieving a light display.

Figure 7:
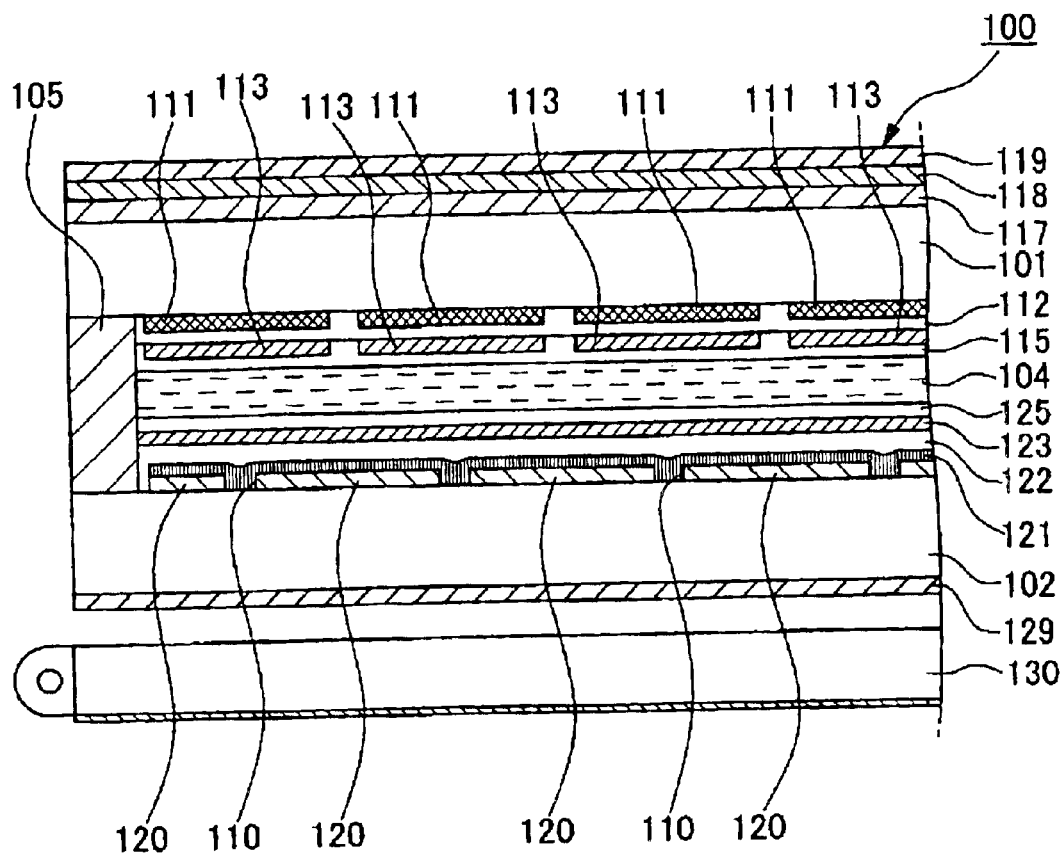
FIG. 7 is a partial sectional view showing an example of a liquid crystal display device comprising a polarizing layer provided on the inner surface of a substrate.
Figure 8:
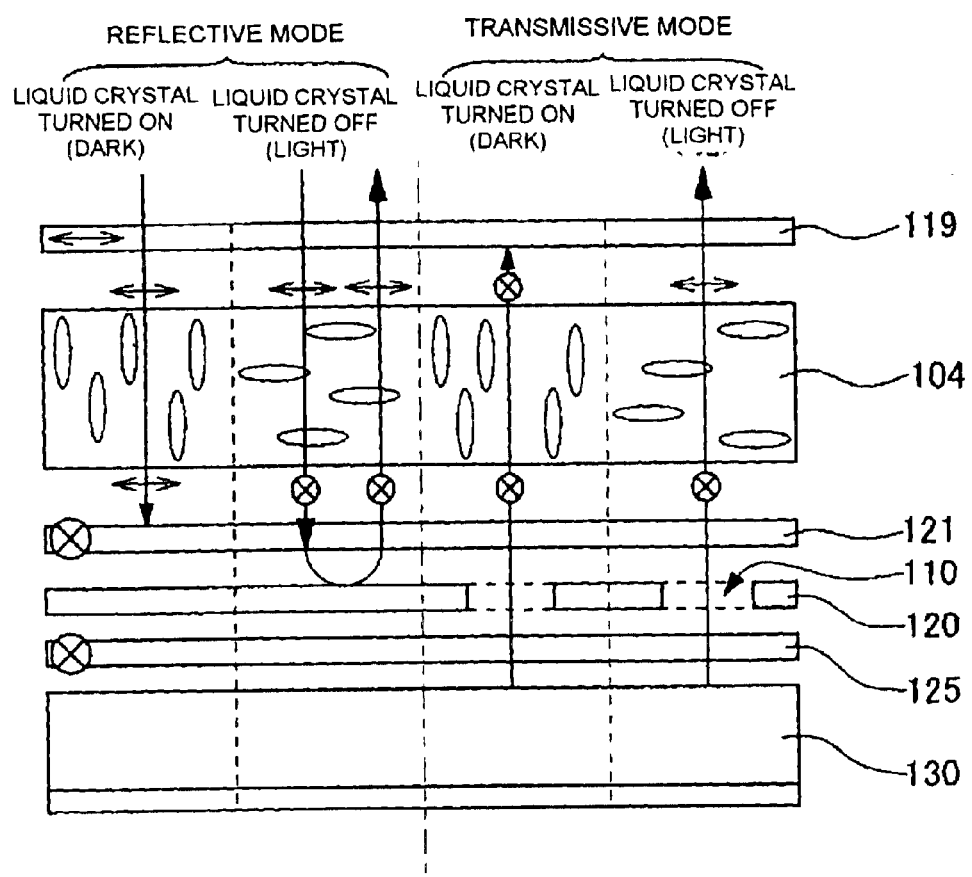
FIG. 8 is a drawing illustrating the operation principle of the liquid crystal display device shown in FIG. 7.

In this way, in the liquid crystal display device of this embodiment, in the light display in the transmissive mode, light incident on the polarizing plate 19 from the liquid crystal layer 4 is linearly polarized light, and thus the light is hardly absorbed by the polarizing plate 19. In the transmissive mode, the light incident on the liquid crystal layer 4 does not pass through the lower polarizing layer 21, and thus the light passing through the through holes 20a of the reflective layer 20 is not absorbed by the lower polarizing layer 21. It is thus possible to solve the problem of the liquid crystal display device shown in FIG. 7, which comprises the polarizing layer provided over the entire inner surface of a substrate, to achieve a brighter display.

Therefore, the liquid crystal display device of this embodiment is capable of a bright transmissive mode display as compared with a conventional display device, and thus a liquid crystal display device exhibiting a small difference in brightness between the reflective and transmissive modes, and excellent visibility can be realized.

In this embodiment, the passive matrix-type liquid crystal display device is described as an example of a liquid crystal display device according to the present invention. However, the present invention is not limited to this construction, and can also be applied to any transflective liquid crystal display device having through holes (aperture) formed in a reflective layer regardless of the liquid crystal driving system. For example, the present invention can be applied to an active matrix-type liquid crystal display device without any problem.

(Method of Manufacturing a Liquid Crystal Display Device)

A method of manufacturing a liquid crystal display device according to the present invention will be described with reference to the drawings. In this embodiment, four manufacturing methods comprising different constructions and manufacturing steps are described. In any one of the manufacturing methods described below, only the manufacturing step of selectively forming a lower polarizing layer on the inner surface of a lower substrate, which is a characteristic of the present invention, is described in detail below. A detailed description of electrodes and an alignment film provided on the lower substrate, and the method of producing an upper substrate is omitted.

Also, all liquid crystal display devices manufactured by the manufacturing methods have equivalent optical functions, and can be operated based on the operation principle shown in FIG. 2.

[First Manufacturing Method]

Figure 3:
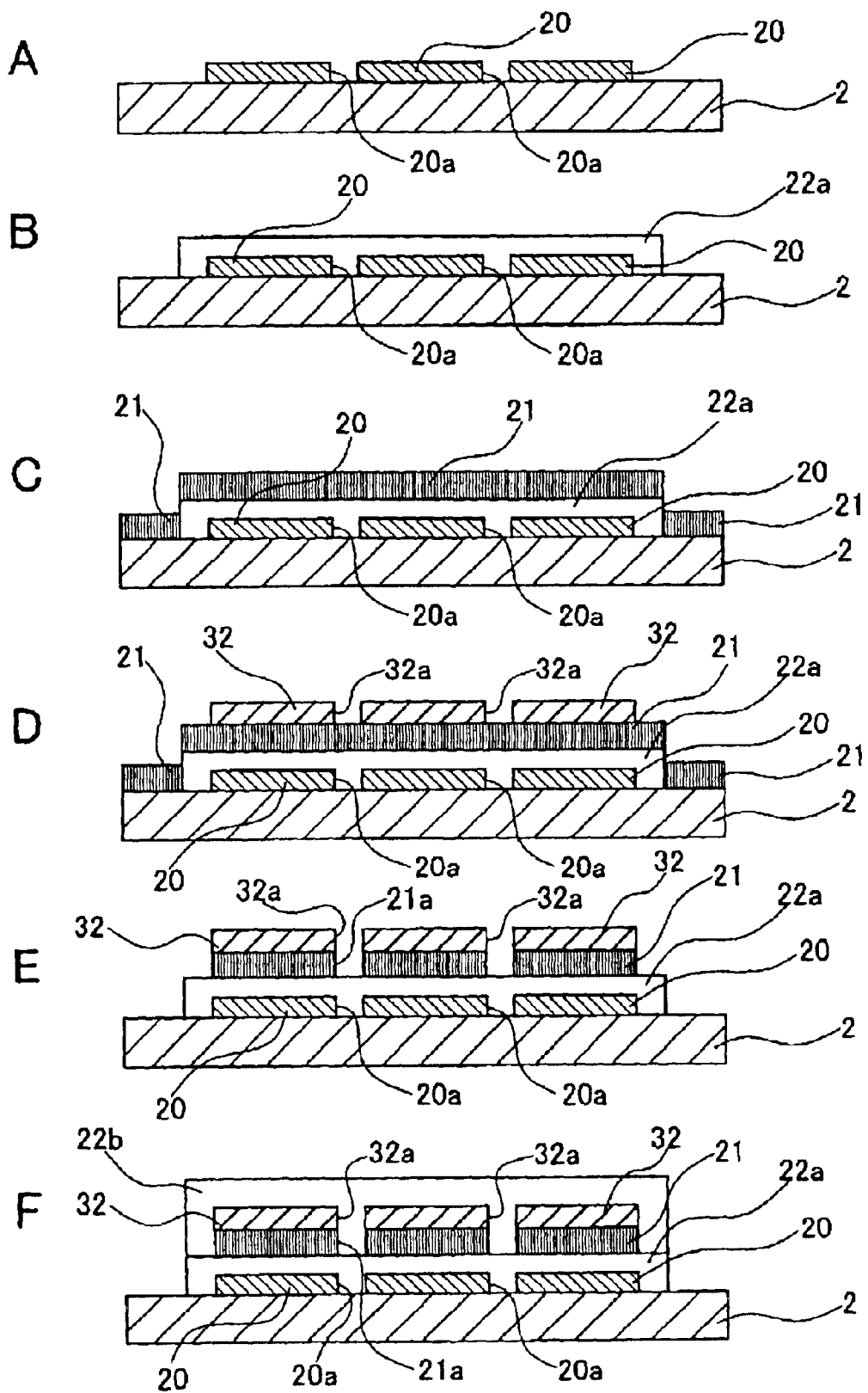
FIG. 3 is a sectional view showing steps of a first method of manufacturing a liquid crystal display device according to the present invention.

FIG. 3 is a sectional view showing steps of the first method of manufacturing a liquid crystal display device according to the present invention. In FIG. 3, the steps are shown in order from the top.

In manufacturing the liquid crystal display device by the first manufacturing method of the present invention, a lower substrate 2 comprising glass or a transparent resin is first prepared, and then a metal material such as Al, Ag, or the like is deposited in a solid state on the lower substrate 2 to form a reflective layer 20. As shown in FIG. 3A, through holes 20a are formed at predetermined positions in the reflective layer 20 to pass through the reflective layer 20 by a photolithography process, and unnecessary portions of the reflective layer 20, such as portions in the periphery of the substrate 2, are removed. After the through holes 20a are formed, as shown in FIG. 3B, a protective layer 22a comprising a resin material is formed to cover the reflective layer 20 to planarize steps between the surface of the reflective layer 20 and the through holes 20a. As the resin material for forming the protective layer, a transparent resin with high transmittance, such as an acrylic or polyimide resin, or the like, is preferably used.

Next, as shown in FIG. 3C, a lower polarizing layer 21 is formed over the entire surface of the substrate 2 including the protective layer 22a. An example of the method of forming the lower polarizing layer 21 is a method comprising coating an aqueous solution of a water-soluble lyotropic liquid crystal dye material mainly composed of a lyotropic liquid crystal on the protective layer 22a under the stress applied in a predetermined direction. This method can form the lower polarizing layer 21 having a transmission axis parallel to the stress direction.

Next, a photosensitive resin layer is formed in a solid shape on the lower polarizing layer 21. As shown in FIG. 3D, the photosensitive resin layer is then patterned in substantially the same planar shape as the reflective layer 20 by a photolithography process to selectively dispose the photosensitive resin layer on the lower polarizing layer 21, thereby forming a photosensitive resin layer 32 having apertures 32a at substantially the same planar positions as the through holes of the reflective layer 20.

Next, the upper side of the lower substrate 2 shown in FIG. 3D is washed with water to partially remove the lower polarizing layer 21. In this removing step, as shown in FIG. 3E, the lower polarizing layer 21 is left on the protect layer 22a in portions where the photosensitive resin layer 32 is formed, and removed from portions where the photosensitive resin layer 32 is not formed, to pattern the lower polarizing layer 21 in substantially the same planar shape as the photosensitive resin layer 32. As a result, apertures 21a are formed in the lower polarizing layer 21 at substantially the same planar positions as the apertures 32a of the photosensitive resin layer 32. The reason why the lower polarizing layer 21 can be removed by water washing is that the material for forming the lower polarizing layer 21 is the water-soluble lyotropic liquid crystal dye material.

In these steps, the through holes 20a of the reflective layer 20, the apertures 21a of the lower polarizing layer 21, and the apertures 32a of the photosensitive resin layer 32 are formed at substantially the same planar positions.

Finally, as shown in FIG. 3F, a protective layer 22b is formed to cover the photosensitive resin layer 32 and the lower polarizing layer 21, thereby forming the lower polarizing layer 21 on the inner surface of the lower substrate 2 according to the present invention.

In actually manufacturing the liquid crystal display device, transparent electrodes are formed in a strip-like planar shape on the protective layer 22b shown in FIG. 3F, and the alignment film is formed to cover the transparent electrodes to form the lower substrate. The lower substrate is opposed to an upper substrate separately prepared, and both substrates are sealed with a sealing material having a substantially frame planar shape and disposed on the inner surfaces of the peripheries of the substrates. Then, a liquid crystal is charged in the space surrounded by the sealing material and both substrates to form a liquid crystal panel. Then, a polarizing plates and forward scattering plate are disposed on the outer surfaces of the liquid crystal panel.

In the second to fourth manufacturing methods described below, the methods of producing members other than the lower substrate 2 are the same as the above-described manufacturing method, and a conventional method of manufacturing a liquid crystal display device can also be applied. Therefore, in the second to fourth manufacturing methods, only the construction and forming method for the lower substrate 2, which is a characteristic of the present invention, is described in detail below, and a detailed description of other components is omitted.

In the above-described first manufacturing m the protective layer 22a is provided to cover the reflective layer 20 after the through holes 20a are formed in the reflective layer 20. Therefore, if the surface of the protective layer 22a can be planarized, good orientation can be obtained in the lower polarizing layer 21 disposed on the through holes 20a can be sufficiently oriented, thereby possibly causing no deterioration in brightness of the transmission mode due to a decrease in the polarizing function. However, the lower polarizing layer 21 and the reflective layer 20 are preferably formed as adjacent to each other as possible, and thus the protective layer 22a is preferably formed to be as thick as possible. Therefore, it is supposed that irregularity caused by the steps between the reflective layer 20 and the through holes 20a cannot be planarized by the protective layer 22a. In this case, a defect occurs in the orientation of the liquid crystal material of the lower polarizing layer 21 above the through holes 20a, and thus the apertures 21a are preferably formed in the lower polarizing layer 21 like in the first manufacturing method.

[Second Manufacturing Method]

Figure 4:
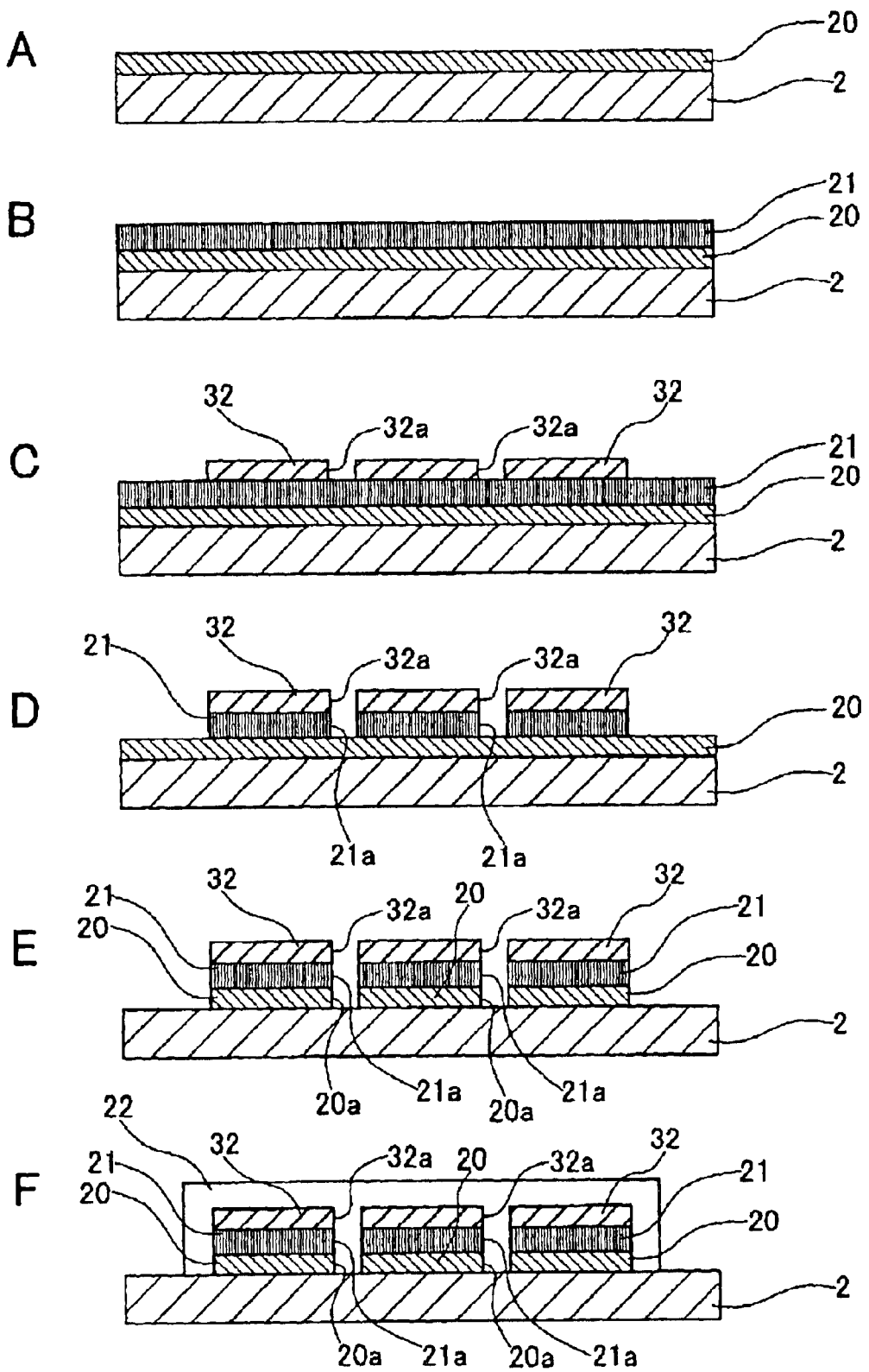
FIG. 4 is a sectional view showing steps of a second method of manufacturing a liquid crystal display device according to the present invention.

Next, the second method of manufacturing the liquid crystal display device according to the present invention will be described below with reference to FIG. 4.

In manufacturing the liquid crystal display device by the second manufacturing method of the present invention, as shown in FIG. 4A, a metal thin film of Al, Ag, or the like is formed in a solid shape over the entire upper surface of a lower substrate 2 comprising glass, a resin or the like to form a reflective layer 20. Next, as shown in FIG. 4B, a lower polarizing layer 21 is formed over the entire surface of the reflective layer 20 by the same method as in the first manufacturing method.

Next, after the reflective layer 20 is formed, a photosensitive resin layer 32 is formed over the entire surface of the lower polarizing layer 21 formed as described above, and then patterned by a photolithography process to form apertures 32a passing through the photosensitive resin layer 32, and remove unnecessary portions in the periphery of the substrate 2, as shown in FIG. 4C.

Next, the upper side of the substrate 2 shown in FIG. 4C is washed with water to partially remove the lower polarizing layer 21. In this removing step, the lower polarizing layer 21 is left only below the photosensitive resin layer 32, and removed from other portions in the same manner as the first manufacturing method. As a result, as shown in FIG. 4D, apertures 21a passing through the lower polarizing layer 21 are formed at substantially the same planar positions as the apertures 32a of the photosensitive resin layer 32. Also, the lower polarizing layer 21 is removed from a portion outside the photosensitive resin layer 32.

Next, as shown in FIG. 4E, the reflective layer 20 is patterned by using the photosensitive resin layer 32 and the lower polarizing layer 21 as a mask to form through holes 20a in the reflective layer 20, the through holes 20a having substantially the same planar shape as the apertures 21a of the lower polarizing layer 21. The reflective layer 20 can be patterned by a known method such as dry etching or the like. In this way, the lower polarizing plate 21 and the reflective layer 20 can be formed in substantially the same planar shape as the photosensitive resin layer 32, which was first patterned.

Finally, a protective layer 22 is formed to cover the photosensitive resin layer 32, thereby forming the lower substrate 2 comprising the lower polarizing layer 21 according to the present invention.

The second manufacturing method can manufacture the lower substrate 2 provided in the liquid crystal display device shown in FIG. 1. This method uses one photosensitive resin layer 32 for patterning the lower polarizing layer 21 and patterning the reflective layer 20, and thus the photolithography process may be performed once, as compared with the first manufacturing method requiring two times of the photolithography process (for patterning the reflective layer 20 and patterning the lower polarizing layer 21). Therefore, the second manufacturing method is capable of manufacturing a liquid crystal display device comprising the lower polarizing plate 21, which has the apertures 21a formed in the lower polarizing plate 21 at substantially the same planar positions as the reflective layer 20, without significantly increasing the number of the steps in comparison to a conventional method of manufacturing a liquid crystal display device.

[Third Manufacturing Method]

Figure 5:
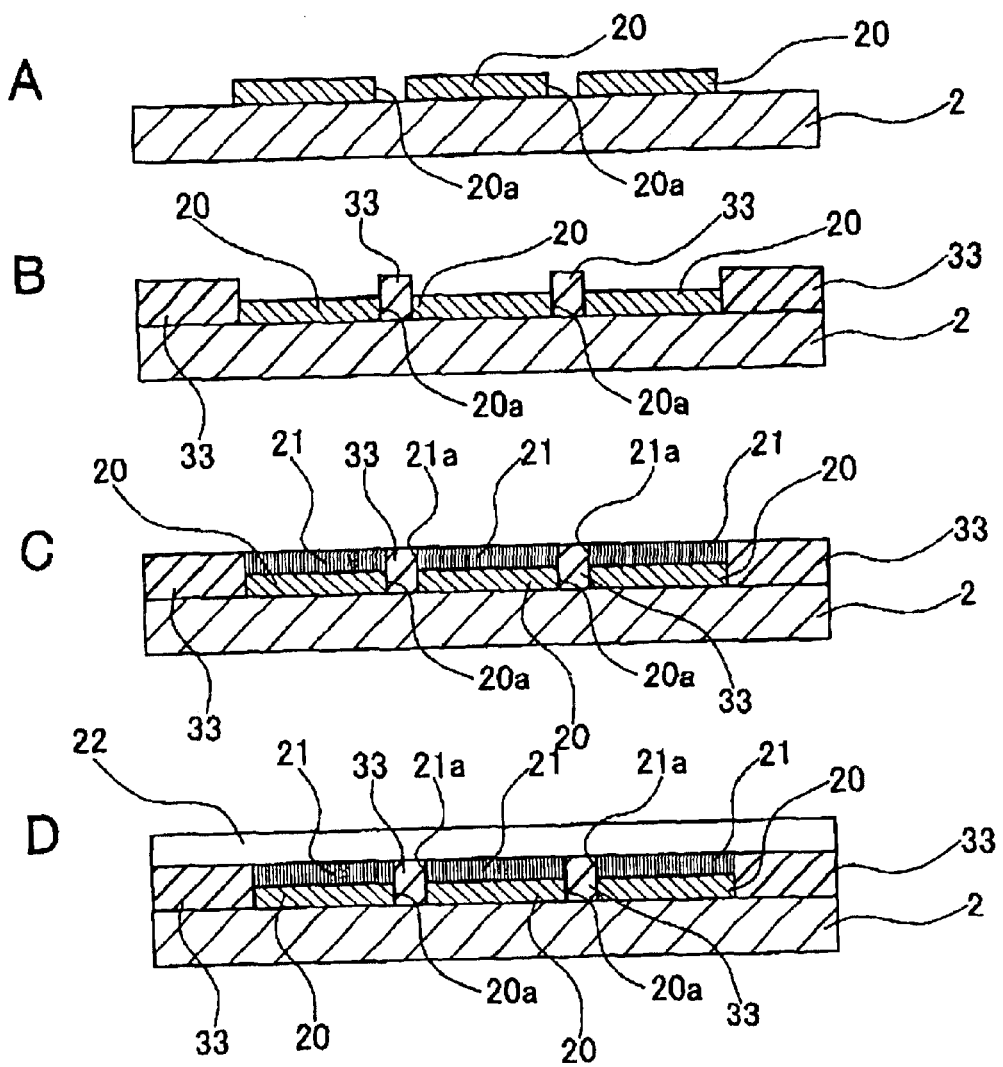
FIG. 5 is a sectional view showing steps of a third method of manufacturing a liquid crystal display device according to the present invention.

Next, the third method of manufacturing the liquid crystal display device according to the present invention will be described below with reference to FIG. 5.

In manufacturing the liquid crystal display device by the third manufacturing method of the present invention, as shown in FIG. 5A, a metal material such as Al, Ag, or the like is deposited in a solid form on a lower substrate 2 comprising glass, a transparent resin, or the like to form a reflective layer 20. Then, through holes 20a are formed at predetermined positions of the reflective layer 20 to pass through the reflective layer 20 by a photolithography process, and at the same time, an unnecessary portion of the reflective layer 20 in the periphery of the substrate 2 is removed.

Next, as shown in FIG. 5B, after the through holes 20a are formed, a water-repellent resin 33 is selectively disposed in the through holes 20a formed in the reflective layer 20a. The water-repellent resin 33 can be selectively disposed by a printing means, for example, a droplet discharge device or the like. The water-repellent resin 33 is preferably formed to a height larger than the thickness of at least the reflective layer 20. By setting the height of the water-repellent resin 33 as described above, the lower polarizing layer 21 can be more securely selectively disposed in the step described below. Although the resin material for forming the water-repellent resin is not limited, for example, a fluorocarbon resin or the like can be used.

Next, as shown in FIG. 5C, a solution of a liquid crystal material for forming the lower polarizing layer 21 is coated on the water-repellent resin 33 and the reflective layer 20. As the liquid crystal material, the same as the water-soluble lyotropic liquid crystal dye material used in the first manufacturing method is used. Therefore, the coated liquid crystal material solution is expelled from the water-repellent resin 33 to be disposed only on the reflective layer 20 between layers of the water-repellent resin 33, 33. Then, the solution is solidified to obtain the lower polarizing layer 21 selectively disposed only on the reflective layer 20.

Finally, as shown in FIG. 5D, a protective layer 22 is formed to cover the water-repellent resin 33 and the lower polarizing layer 21, thereby forming the lower substrate 2 comprising the lower polarizing layer 21 according to the present invention.

The third manufacturing method uses the water-soluble lyotropic liquid crystal dye material as the material for forming the lower polarizing layer 21 so that the water-repellent resin is provided in the through holes 20a of the reflective layer 20 to avoid the lower polarizing layer 21 from being formed on the through holes 20a. Therefore, the third manufacturing method does not require the step for removing the lower polarizing layer, and thus has the advantage that the lower polarizing layer 21 can be easily selectively disposed, as compared with the first and second manufacturing methods.

[Fourth Manufacturing Method]

Figure 6:
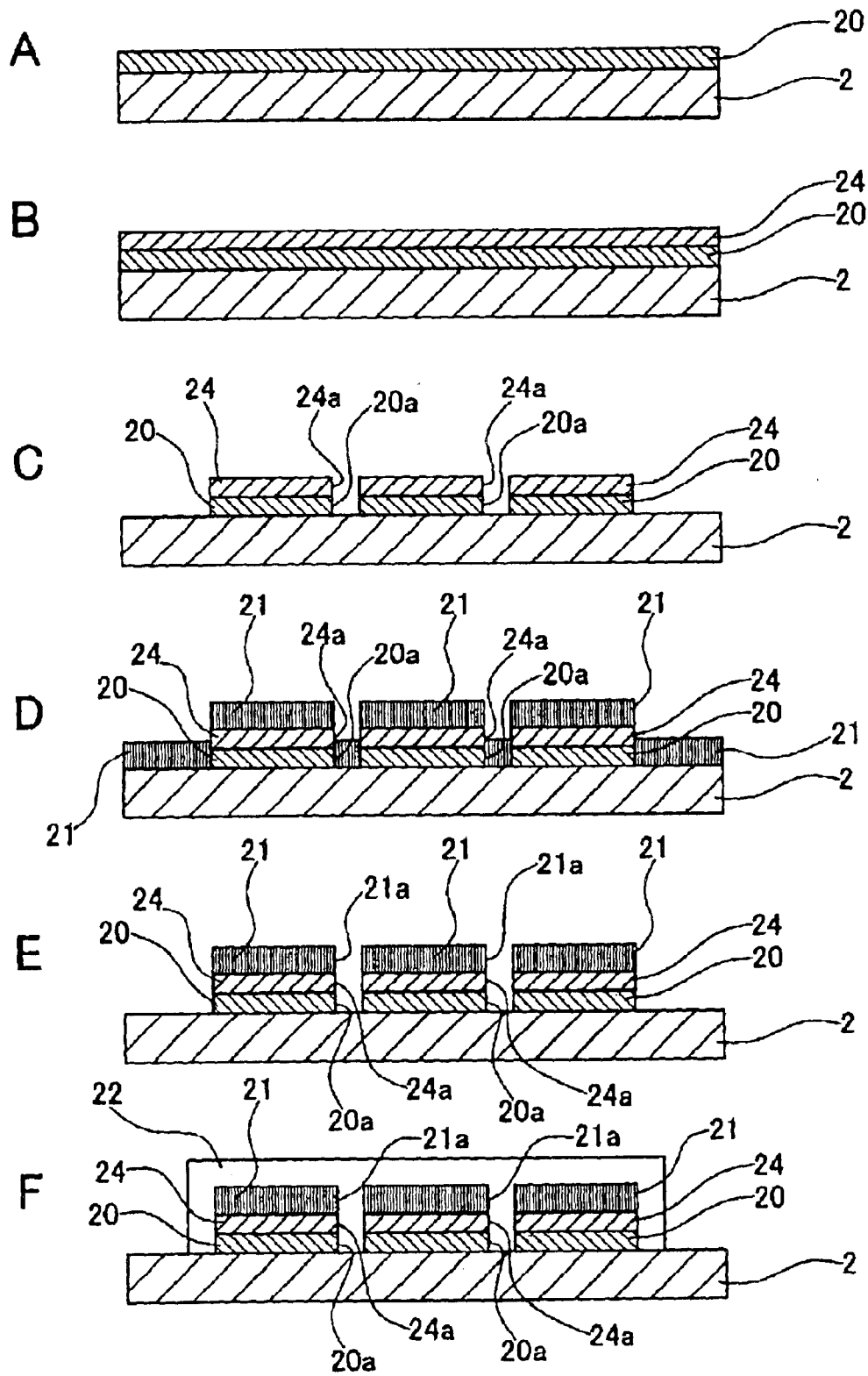
FIG. 6 is a sectional view showing steps of a fourth method of manufacturing a liquid crystal display device according to the present invention.

Next, the fourth method of manufacturing the liquid crystal display device according to the present invention will be described below with reference to FIG. 6.

In manufacturing the liquid crystal display device by the fourth manufacturing method of the present invention, as shown in FIG. 6A, a metal thin film of Al, Ag, or the like is formed in a sold shape over the entire upper Deface of a lower substrate 2 shown in the drawing, which comprises glass, a resin, or the like, to form a reflective layer 20. Then, as shown in FIG. 6B, a transparent conductive material layer 24 comprising a transparent conductive material such as ITO or the like is formed over the entire surface of the reflective layer 20.

Next, the transparent conductive material layer 24 and the reflective layer 20 are patterned by a photolithography process to form through holes 20a in the reflective layer 20, and through holes 24a in the transparent conductive material layer 24, the through holes 24a having substantially the same planar shape as the through holes 20a. These through holes 20a and 24a can be formed at a time. At the same time, unnecessary portions of the reflective layer 20 and the transparent conductive layer 24 in the periphery of the substrate 2 are removed in this step.

Next, as shown in FIG. 6D, a lower polarizing layer 21 is formed on the patterned transparent conductive material layer 24 by the same method as in the first manufacturing method. The liquid crystal material used for forming the lower polarizing layer 21 formed in this step has high adhesion to the transparent conductive material comprising the transparent conductive material layer 24, while the liquid crystal material has low adhesion to the glass substrate constituting the lower substrate 2. Therefore, the portions of the lower polarizing layer 21, which are directly formed on the substrate 2, can be easily removed.

Next, as shown in FIG. 6E, the lower substrate 2 obtained as described above is ultrasonic-washed with an organic solvent such as isopropyl alcohol or the like to remove the portions of the lower polarizing layer 21, which are directly formed on the lower substrate 2 and can easily be removed. In this removing step, the lower polarizing layer 21 formed on the transparent conductive material layer 24 is strongly adhered to the transparent conductive material layer 24, and thus mostly remains on the transparent conductive material layer 24 without being removed. The lower polarizing layer 21 selectively formed on the transparent conductive material layer 24 has apertures corresponding to the through holes 20a and 24a of the reflective layer 20 and the transparent conductive material layer 24, forming apertures 21a in the lower polarizing layer 21.

Finally, a protective layer 22 is formed to cover the reflective layer 20 and the lower polarizing layer 21, thereby forming the lower substrate 21 comprising the lower polarizing layer 21 according to the present invention.

The fourth manufacturing method uses the adhesion of the liquid crystal material for forming the lower polarizing layer 21, for selectively disposing the lower polarizing layer 21. This manufacturing method does not require a photosensitive resin layer to be formed for partially removing the lower polarizing layer 21, and is capable of selectively disposing the lower polarizing layer 21 by a simple manufacturing method like in the third manufacturing method.

The lower substrate 2 which can be formed by any one of the first to fourth manufacturing methods can be applied to the liquid crystal display device shown in FIG. 1, and can be used for operating the liquid crystal display device based on the operation principle shown in FIG. 2. A manufacturing method may be appropriately selected in consideration of the ease of manufacture and the manufacturing yield.

(Electronic Apparatus)

Examples of an electronic apparatus comprising the liquid crystal display device of any one of the above-described embodiments will be described.

Figure 9:
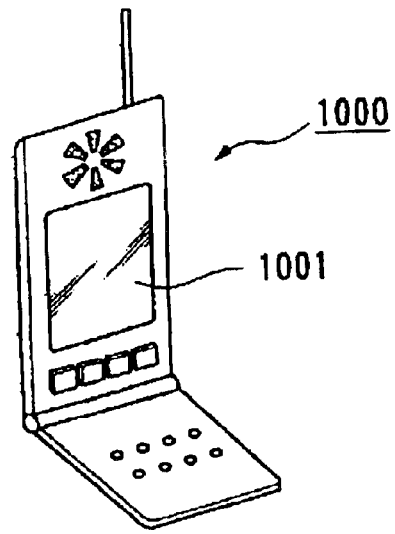
FIG. 9 is a perspective view showing examples of a construction of an electronic apparatus according to the present invention.
Figure 9:
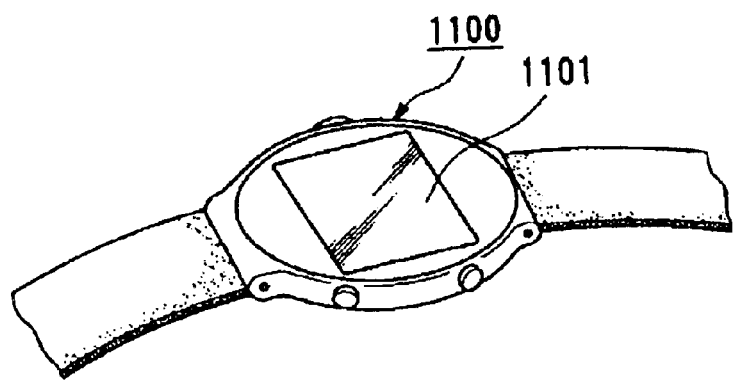
Figure 9:
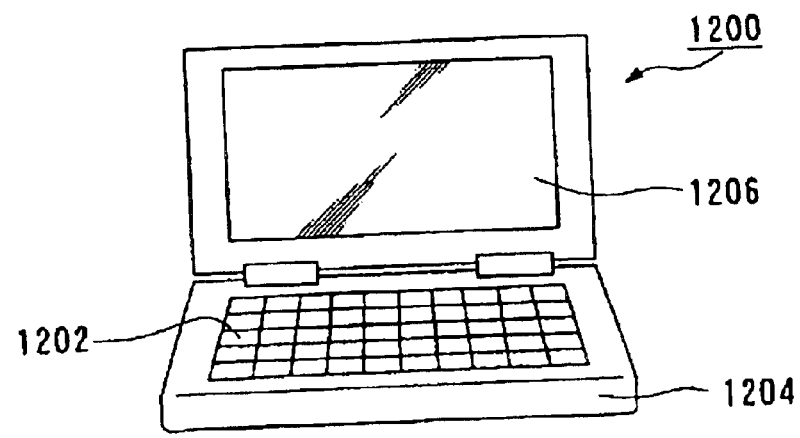

FIG. 9A is a perspective view showing an example of a cellular phone. In FIG. 9A, reference numeral 1000 denotes a cellular phone body, and reference numeral 1001 denotes a liquid crystal display part using the liquid crystal display device.

FIG. 9B is a perspective view showing an example of a wristwatch electronic apparatus. In FIG. 9B, reference numeral 1100 denotes a watch body, and reference numeral

1101 denotes a liquid crystal display part using the liquid crystal display device.

FIG. 9C is a perspective view showing an example of portable information processors such as a word processor, a personal computer, and the like. In FIG. 9C, reference numeral 1200 denotes an information processor; reference numeral 1202, an input part such as a keyboard or the like; reference numeral 1204, an information processor body; and reference numeral 1206, denotes a liquid crystal display part using the liquid crystal display device.

Each of the electronic apparatuses shown in FIGS. 9A to 9C comprises the liquid crystal display part using the liquid crystal display device according to any one of the above embodiments to realize an electronic apparatus having a display part capable of achieving a bright display in the transmission mode.

As described above, a liquid crystal display device of the present invention comprises a liquid crystal panel which comprises a liquid crystal layer sandwiched between opposed upper and lower substrates, and upper and lower polarizing layers provided at the top and bottom of the liquid crystal layer, a lower polarizing plate provided on the outer surface of the lower substrate, and a reflective layer partially formed on the inner surface of the lower substrate, the lower polarizing layer being formed only on the reflective layer in a display region. Therefore, light which passes through a region without the reflective layer and which is incident on the liquid crystal layer is not dampened by the polarizing layer, and thus the light passing through the through holes can be almost completely utilized for a display, thereby improving the display brightness in the transmissive mode. As a result, a difference in brightness between the reflective mode and the transmissive mode can be decreased to achieve excellent visibility.

In the present invention, the method of manufacturing a liquid crystal display device comprises the step of forming through holes passing through a reflective layer formed on a lower substrate, the step of forming a protective layer to cover the reflective layer having the through holes, the step of forming a lower polarizing layer on the protective layer by using a water-soluble lyotropic liquid crystal dye material, the step of forming a photosensitive resin layer on the lower polarizing layer, the step of forming apertures in the photosensitive resin layer at substantially the same planar positions as the through holes, and the step of partially removing the lower polarizing layer through the apertures of the photosensitive resin layer. This manufacturing method can easily manufacture a liquid crystal display device comprising a lower polarizing layer formed on a reflective layer, wherein through holes are formed in the reflective layer at substantially the same planar positions as apertures of the lower polarizing layer.

What is claimed is:

1. A liquid crystal display device, comprising:
    a liquid crystal panel including a liquid crystal layer sandwiched between opposed first and second substrates, a first polarizing layers disposed to the first substrate side of the liquid crystal layer, and a second polarizing layer disposed to the second substrate side of the liquid crystal layer;
    a polarizing plate provided on an outer surface of the second substrate; and
    a reflective layer partially formed over an inner surface of the second substrate, the second polarizing layer being formed only over the reflective layer within a display region.

2. The liquid crystal display device according to claim 1, the reflective layer and the second polarizing layer being formed in substantially the same planar shape.

3. The liquid crystal display device according to claim 1, further comprising a light diffusing device provided above the reflective layer or on the reflective layer.

4. The liquid crystal display device according to claim 1, further comprising a light transmitting resin layer provided in a region where the reflective layer and second polarizing layer are not provided.

5. The liquid crystal display device according to claim 1, further comprising a protective layer formed to cover the reflective layer, the second polarizing layer being formed on the protective layer at substantially the same planar position as the reflective layer.

6. The liquid crystal display device according to claim 1, the second polarizing layer including a water-soluble dichroic dye.

7. An electronic apparatus, comprising:
    the liquid crystal display device according to claim 1.

8. A liquid crystal display device, having a reflective region and transmissive region comprising:
    a liquid crystal panel including a liquid crystal layer sandwiched between opposed first and second substrates, a first polarizing layer disposed to the first substrate side of the liquid crystal layer, and a second polarizing layer disposed to the second substrate side of the liquid crystal layer;
    a polarizing plate provided on an outer surface of the second substrate; and
    a reflective layer partially formed on an inner surface of the second substrate, the second polarizing layer being formed over the reflective region and being formed over other regions than transmissive region within a display region.

\* \* \* \* \*